United States Patent [19]
Kawashima

[11] Patent Number: 6,085,592
[45] Date of Patent: Jul. 11, 2000

[54] ULTRASONIC SENSOR AND OBSTRUCTION DETECTOR HAVING ACCURATE OBSTRUCTION DETECTION CAPABILITIES

[75] Inventor: Yasuhiro Kawashima, Kariya, Japan

[73] Assignee: Denso Corporation, Kariya, Japan

[21] Appl. No.: 08/949,474

[22] Filed: Oct. 14, 1997

[30] Foreign Application Priority Data

Oct. 15, 1996 [JP] Japan .................................. 8-272693

[51] Int. Cl.$^7$ .................................................. G01N 29/24
[52] U.S. Cl. .......................... 73/632; 73/598; 73/432.1; 367/99; 367/909
[58] Field of Search ................................ 367/99, 909, 13, 367/902, 188; 340/904, 943, 939, 942; 73/597, 598, 602, 627, 432.1, 632

[56] References Cited

U.S. PATENT DOCUMENTS

| | | | |
|---|---|---|---|
| 3,935,484 | 1/1976 | Leschek et al. | 310/327 |
| 4,326,273 | 4/1982 | Vancha | 367/112 |
| 4,701,893 | 10/1987 | Muller et al. | 367/87 |
| 4,796,726 | 1/1989 | Kobayashi et al. | 181/123 |
| 4,803,670 | 2/1989 | Chen | 367/99 |
| 4,918,672 | 4/1990 | Iwabuchi et al. | 367/99 |
| 4,994,800 | 2/1991 | Milliken | 340/901 |
| 5,495,765 | 3/1996 | Dykes et al. | 73/632 |

*Primary Examiner*—Hezron Williams
*Assistant Examiner*—Rose M. Miller
*Attorney, Agent, or Firm*—Pillsbury Madison & Sutro, LLP

[57] ABSTRACT

A short ring is mounted onto a back part of a housing of an ultrasonic sensor so that the short ring is coaxial with the housing. The width of the short ring along the axial direction of the housing is set such that it shields the back part of the housing including a transformer of a processor. The short ring is made up of an excellent metal conductor and is coaxial with the coils of the transformer.

42 Claims, 9 Drawing Sheets

ULTRASONIC SENSOR AND OBSTRUCTION DETECTOR HAVING ACCURATE OBSTRUCTION DETECTION CAPABILITIES

CROSS-REFERENCE TO RELATED APPLICATION

This application is related to and claims priority from Japanese Patent Application No. Hei-8-272693, the contents of which are hereby incorporated by reference.

BACKGROUND OF THE INVENTION

1. Field of the Invention

The present invention relates to an ultrasonic sensor for use in obstruction detectors, automatic doors and the like. The present invention also relates to an obstruction detector which has the ultrasonic sensor.

2. Description of Related Art

One example of a conventional obstruction detector is a corner sonar that includes an ultrasonic sensor attached to a front bumper of a vehicle and a controller connected to the ultrasonic sensor.

Utilizing the resonance phenomenon exhibited by an ultrasonic resonator, the ultrasonic sensor emits ultrasonic waves. The resonance phenomenon may be generated based on a resonance voltage from the controller.

When ultrasonic waves reflected from an obstruction in the forward direction is received by the ultrasonic resonator, the ultrasonic sensor emits the reflected ultrasonic waves as the reception signal to the controller using a resonance circuit that includes the ultrasonic resonator and a coil of a transformer. After receiving the reception signal, the controller compares the reception signal with a predetermined threshold level and determines if there is an obstruction or not. It must be noted that the ultrasonic sensor generates the reception signal when it is not receiving the resonance voltage from the controller.

However, in such conventional obstruction detector, changes in the electromagnetic induction field in the vicinity of the ultrasonic sensor may affect the coil of the transformer. That is, the coil might generate a counter electromotive force due to fluctuations in the electromagnetic induction field. Thus, the coil might provide the reception signal that contains noise components (which correspond to the counter electromotive force) to the controller. In this way, because the reception signal contains noise components, the controller might erroneously determine that there is an obstruction even if there is actually none.

SUMMARY OF THE INVENTION

In view of the foregoing problems of the prior art, it is a goal of the present invention to provide an ultrasonic sensor whose coil unit, which together with a resonance circuit exhibits the resonance phenomenon, is not be affected by fluctuations in a surrounding electromagnetic induction field. It is also a goal of the present invention to provide an obstruction detector that employs the ultrasonic sensor.

To achieve the foregoing object, a first aspect of the present invention provides an ultrasonic sensor that includes a housing, a resonance circuit and a conductive ring. The resonance circuit, which is placed inside the housing, includes a coil unit and an ultrasonic resonator. The ultrasonic resonator includes a piezoelectric element. The ultrasonic resonator emits a transmission ultrasonic wave signal towards the outside based on the piezoelectric effect of the piezoelectric element and receives a reception ultrasonic wave signal from the outside. Here, the reception ultrasonic wave signal is a reflection of the transmission ultrasonic wave signal. The conductive ring is disposed around the housing to be coaxial with the coil unit and to shield the coil unit from the external electromagnetic induction field.

In this way, even if a counter electromotive force is produced in the coil unit due to fluctuations in the electromagnetic induction field around the sensor, the conductive ring tries to suppress such counter electromotive force and thus, the reception signal will not have noise components due to such counter electromotive force.

A second aspect of the present invention provides an obstruction detector that includes the ultrasonic sensor and a controller. The controller provides a driving voltage to the resonance circuit to activate the ultrasonic resonator, and receives the reception ultrasonic wave signal from the ultrasonic resonator. Moreover, the controller determines the presence of an obstruction in the forward direction of the ultrasonic sensor by comparing the level of the reception ultrasonic wave signal with a predetermined threshold level.

In this way, because the controller receives the reception signal that does not contain any noise components, the obstruction detector can accurately determine the presence of any obstruction in the forward direction of the ultrasonic sensor.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY PREFERRED EXEMPLARY EMBODIMENTS

Preferred embodiments of the present invention are described hereinafter with reference to the accompanying drawings.

Figure 1:
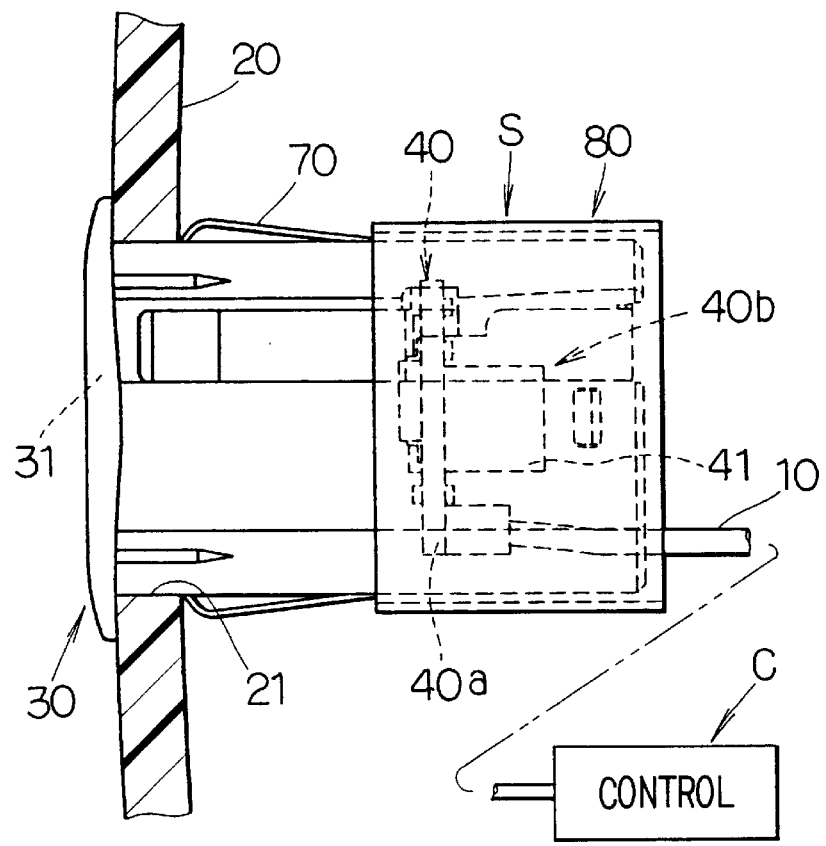
FIG. 1 is a diagram showing the overall construction of a vehicular obstruction detector according to a first preferred embodiment of the present invention.
Figure 2:
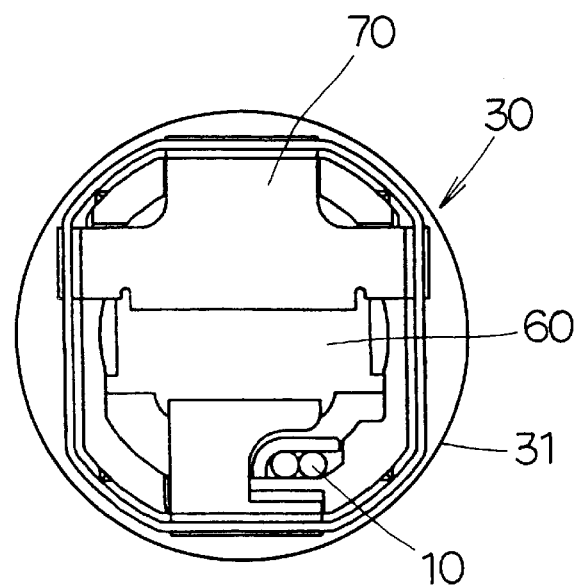
FIG. 2 is a diagram showing the back of an ultrasonic sensor of the vehicular obstruction detector.
Figure 3:
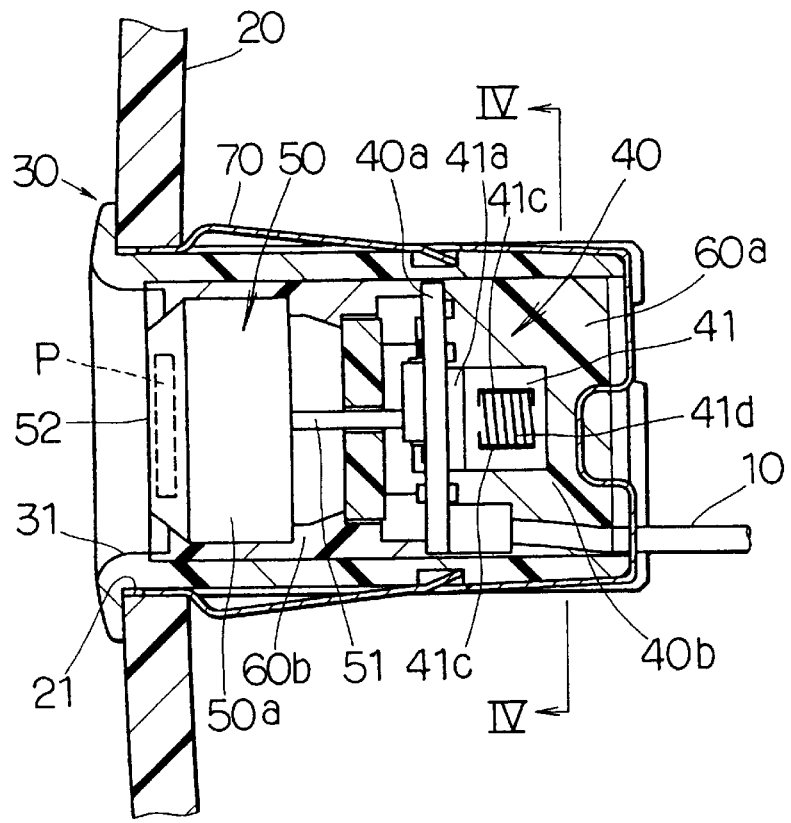
FIG. 3 is a cross-sectional diagram of the ultrasonic sensor.
Figure 4:
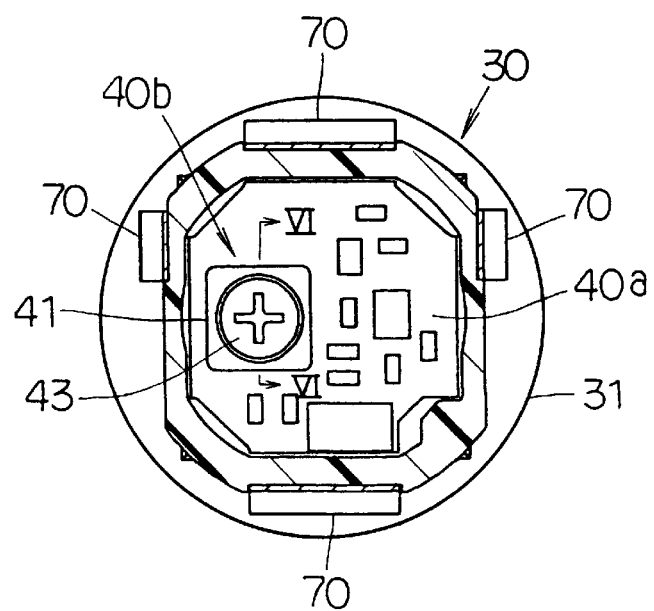
FIG. 4 is a cross-sectional diagram of the ultrasonic sensor as seen from IV—IV of FIG. 3.
Figure 5A:
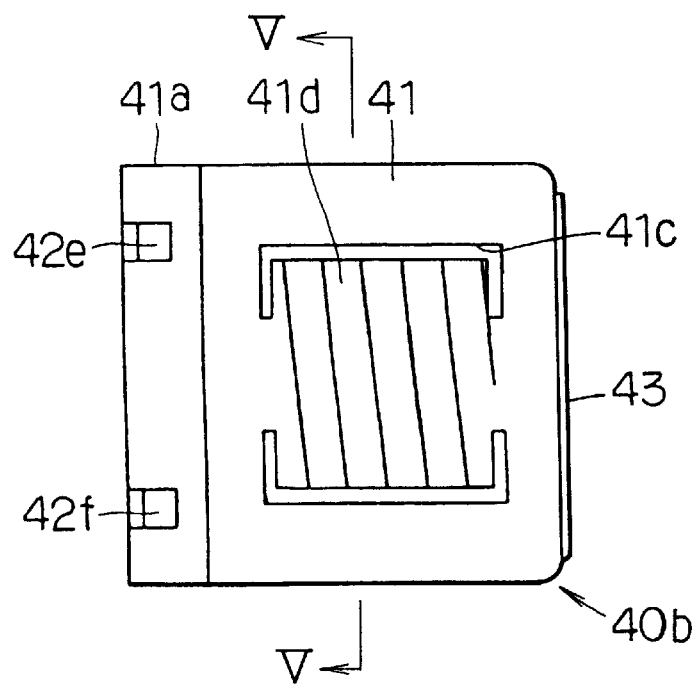
FIG. 5A is a diagram showing a transformer of the ultrasonic sensor.
Figure 5B:
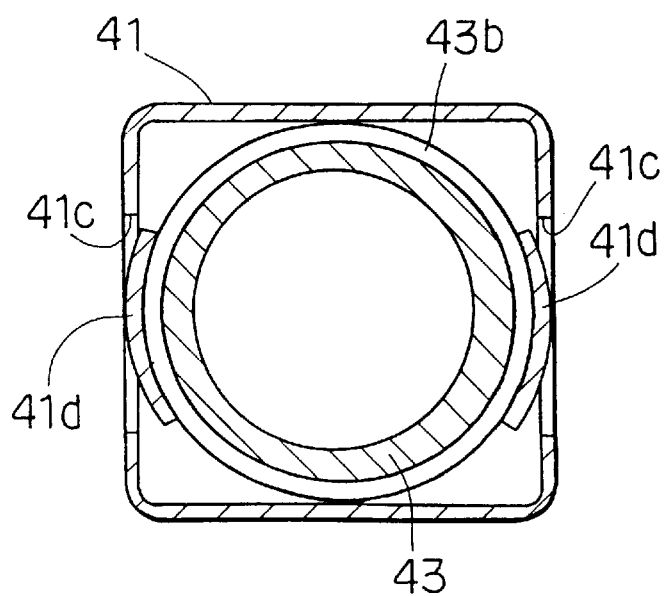
FIG. 5B is a cross-sectional diagram of the transformer as seen from V—V of FIG. 5A.

FIGS. 1 and 2 show the present invention as applied to an obstruction detector that functions as a corner sonar. The obstruction detector includes an ultrasonic sensor S and a controller C. As shown in FIGS. 1 and 3, the ultrasonic sensor S has a cylindrical housing 30. The cylindrical housing 30 is inserted to a through-hole 21 of a vehicular bumper 20 in such a way that its opening 31 is projected towards a forward direction of the vehicle. The housing 30 is made of PBT (polybutylene terephthalate) resin material.

The ultrasonic sensor S has a signal processing circuit 40 and an ultrasonic resonator 50. As shown in FIG. 3, the ultrasonic resonator 50 is filled inside a back portion of the housing 30 using moisture proof silicon gum 60a. On the other hand, as also shown in FIG. 3, the ultrasonic resonator 50 is filled inside a front portion of the housing 30 to be coaxial with the signal processing circuit 40 using vibration-proof elastic material 60b (e.g., silicon gum).

The ultrasonic resonator 50 has a casing 50a made of aluminum, a piezoelectric element P attached to the casing 50a using an epoxy adhesive and a capacitor 53 (refer to FIG. 7) which is filled using silicone gum.

The signal processing circuit 40 includes a circuit board 40a and various electric components (refer to FIG. 7) such as a transformer 40b mounted on the circuit board 40a.

Figure 6:
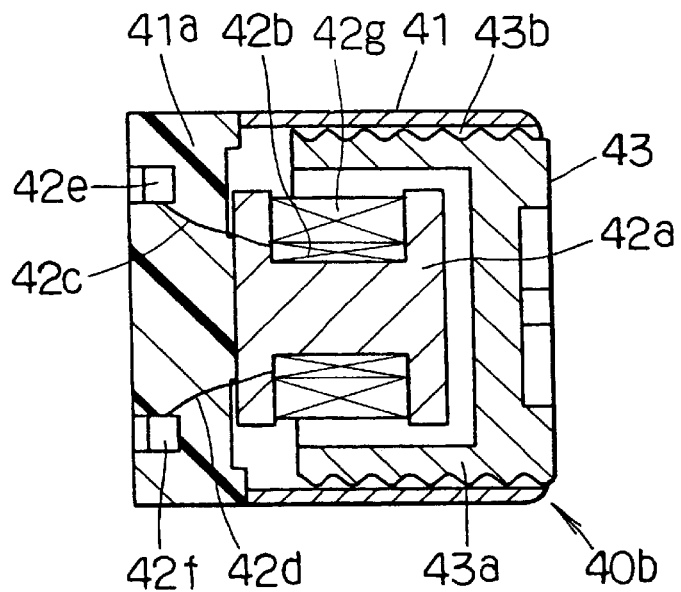
FIG. 6 is a cross-sectional diagram of the transformer as seen from VI—VI of FIG. 4.
Figure 7:
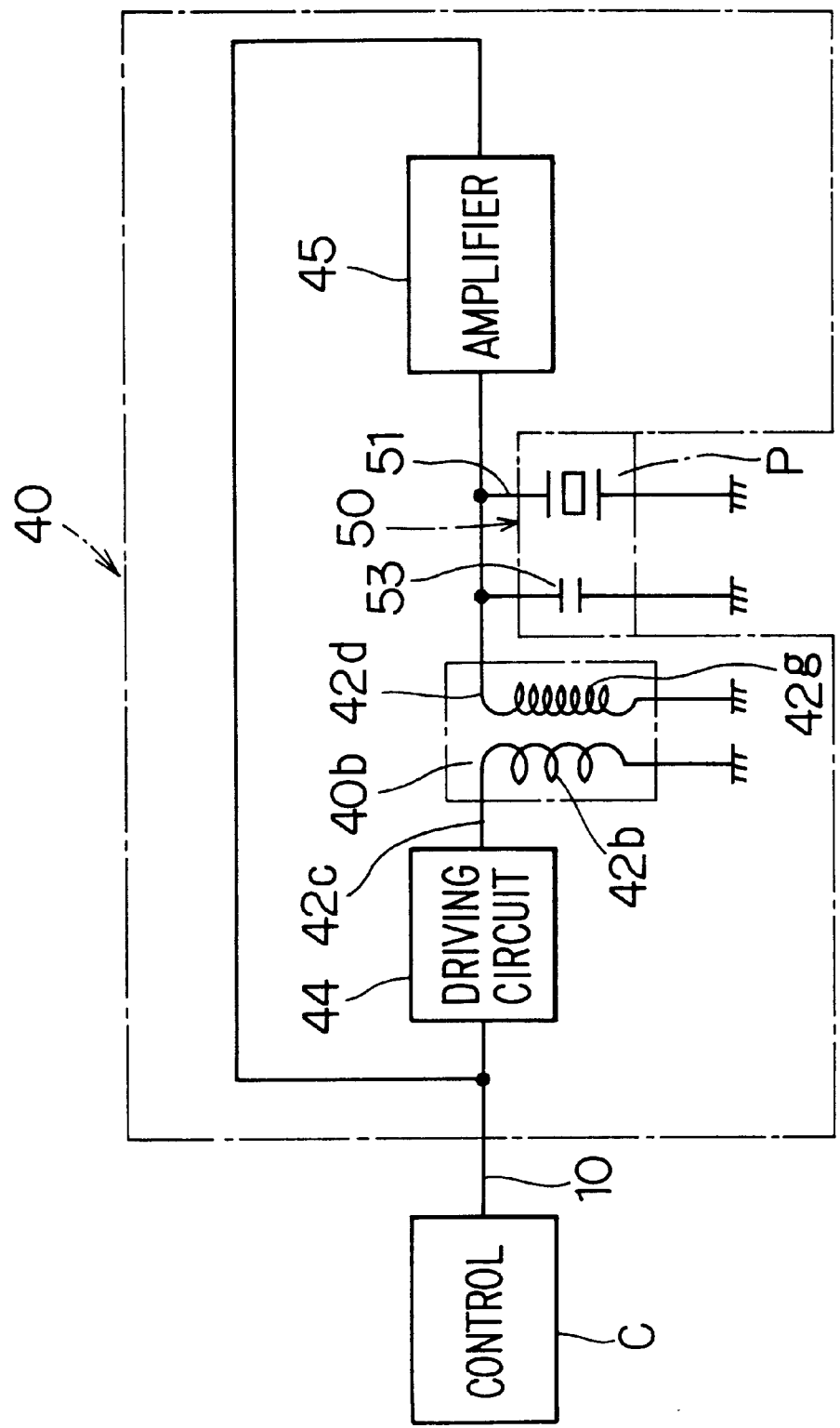
FIG. 7 is a diagram showing a driving circuit, an ultrasonic resonator and the controller of the vehicular obstruction device.

As shown in FIG. 1 and FIGS. 3 to 6, the transformer 40b has a tubular casing 41 made of metal. As shown in FIG. 6, the casing 41 is mounted on the board 40a via a pedestal 41a (which is made up of insulating resin). The casing 41 is coaxial with the pedestal 41a. Furthermore, the transformer 40b has a ferrite core 42a disposed within the casing 41 and coils 42b, 42g that are wound up around the core 42a. As shown in FIG. 7, the coil 42b serves as the primary coil of the transformer 40b while the coil 42g serves as the secondary coil of the transformer 40b.

The ferrite core 42a is mounted on the pedestal 41a to be coaxial with the pedestal 41a itself. One terminal 42c of the primary coil 42b is connected to a terminal 42e while one terminal 42d of the secondary coil 42g is connected to a terminal 42f. The other terminals of the coils 42b, 42g are connected to ground.

The transformer 40b further has a ferrite cover 43 which has an approximately C-shaped cross-section. Through its tubular member 43a, the ferrite cover 43 covers the primary coil 42b and the secondary coil 42g so that it is coaxial with both coils 42b, 42g when it is screwed into the casing 41.

That is, as shown in FIGS. 3–6, the cover 43 is screwed into the casing 41 in such a way that male screw portions 43b formed on the outer periphery of the tubular member 43a engage with female screw portions 41d formed in the periphery of the casing 41. As shown in FIG. 5B, the female screw portions 41d are drawing-processed to form C-shaped slits 41c on the wall of the casing 41. The inductance of a parallel resonance circuit that is described later can be adjusted in accordance with the degree to which the cover 43 is screwed into the casing 41.

The piezoelectric element P of the ultrasonic resonator 50 exhibits the piezoelectric effect and the reverse piezoelectric effect. The positive electrode of the piezoelectric element P is connected to the terminal 42d of the secondary coil 42g via a wire harness 51 and the terminal 42f. The other electrode of the piezoelectric element P is connected to ground via the circuit board 40a and a wire harness 10. The resonance frequency of the ultrasonic resonator 50 is determined based on the mounting of the piezoelectric element P to, for example, the inner side of a vibration face 52 of the casing 50a.

The construction of the ultrasonic resonator 50, the controller C and the signal processing circuit 40 are explained hereinafter with reference to FIG. 7. The piezoelectric element P, the capacitor 53 and the secondary coil 42g of the transformer 40b form the parallel resonance circuit. In more detail, the inductance L of the secondary coil 42g, the value $C_T$ of the capacitor 53, and the capacitance $C_v$ of the piezoelectric element P which does not contribute to the vibration form the parallel resonance circuit which resonates at an inherent resonance frequency of the piezoelectric element.

The signal processing circuit 40 includes the driving circuit 44 which is controlled by the controller C. The driving circuit 44 provides a driving voltage to the primary coil 42b of the transformer 40b. Accordingly, the transformer 40b boosts the driving voltage with the secondary coil 42g generating the boosted driving voltage.

Accordingly, the ultrasonic resonator 50 vibrates due to the piezoelectric effect of the piezoelectric element P. In this way, the ultrasonic resonator 50 emits an ultrasonic wave signal from its vibration face 52 towards the front direction of the vehicle via the opening 31 of the housing 30.

When an obstruction in the forward direction of the vehicle reflects back the ultrasonic wave signal, the ultrasonic resonator 50 receives the reflected signal via its vibration face 52 and sends the signal to the piezoelectric element P. Accordingly, the piezoelectric element P provides a voltage due to the reverse piezoelectric effect to an amplifier 45.

Meanwhile, as shown in FIG. 1, a stainless retainer 70, which covers parts of the housing 30 except for the opening 31, securely fastens the housing 30 to the bumper 20. A short ring (conductive ring) 80 is fitted onto the back part of the housing 30 via the retainer 70. The short ring 80 is set to have a width in the axial direction of the housing 30 to cover the back part of the housing 30 to shield the various components including the transformer 40b of the signal processing circuit 40.

The short ring 80 is made of excellent electrical conductive material such as copper and the like. When there is an electromagnetic induction field due to an external disturbance acting along the axial direction of the short ring 80, the short ring 80 suppresses the electromagnetic induction field induced in the coils 42b, 42g due to the external disturbance.

The controller C provides the control voltage to the driving circuit 44 for every predetermined time interval. The controller C amplifies the reception signal from the signal processing circuit 40 using an amplifier and compares the level of the amplified signal with a threshold value to determine the presence of an obstruction.

In this way, in the present embodiment, when the controller C provides the control voltage to the signal processing circuit 40 via the wire harness 10, the driving circuit 44 provides the driving voltage to the primary coil 42b of the transformer 40b.

Thereafter, the transformer 40b boosts the driving voltage and generates the boosted voltage in the secondary coil 42g. Accordingly, the ultrasonic resonator 50 vibrates due to the piezoelectric effect of the piezoelectric element P and thus, the ultrasonic sensor S emits the ultrasonic signal from the opening 31.

When an obstruction in the front direction of the vehicle reflects back the ultrasonic signal, the vibration face 52 of the ultrasonic resonator 50 receives the reflected wave signal and provides the same wave signal to the piezoelectric element P.

In this way, the piezoelectric element P generates the piezoelectric voltage due to the piezoelectric effect and provides such voltage to the amplifier 45 via the parallel resonance circuit. The amplifier 45 receives the piezoelectric voltage and provides it as the reception signal to the controller C.

The controller C amplifies the reception signal and compares it with a predetermined threshold value. Here, when the level of the amplified reception signal is higher than the aforementioned threshold value, the controller C determines that there is an obstruction in the front direction of the vehicle. The reception of the reflected ultrasonic wave, the processing operation of the signal processing circuit 40 and the detection operation of the controller C are all performed when the controller C is not generating the control voltage.

Meanwhile, when an external disturbance in the vicinity of the ultrasonic sensor S such as an electromagnetic induction field acting on the coil 42g of the transformer 40b along the axial direction of the same coil 42g fluctuates, the electromagnetic induction field will affect the coil 42g in such away that there will be magnetic induction in the coil 42g. Such an external disturbance is, for example, an EMI noise generated in an engine room of a vehicle, that is, an EMI noise generated in synchronism with an ON/OFF signal for an auxiliary machine such as an alternator or a compressor of an air conditioning apparatus. Accordingly, the coil 42g generates a counter electromotive force which it tries to provide to the controller C as the reception signal via the resonance circuit and the amplifier 45.

However, because the short ring 80 is attached to the housing 30 to coaxially cover the coil 42g, the short ring 80 will also exhibit magnetic induction in accordance with the fluctuation in the external electromagnetic induction fields Therefore, the short ring 80 generates a counter electromotive force due to the electromagnetic induction and the inductive field generated by the short ring 80 suppresses the counter electromotive force generated by the coil 42g.

Therefore, as explained in the above, even if a fluctuation in an external electromagnetic induction field acts upon and affects the secondary coil 42g, the electromagnetic induction field generated by the short ring 80 acts to suppress the counter electromotive force generated by the coil 42g. In this way, the reception signal from the signal processing circuit 40 does not contain noise due to an external disturbance such as fluctuation in an external electromagnetic induction field. As a result, the controller C receives only the reception signal that corresponds to the reflected ultrasonic wave and thus, the controller C will not erroneously determine the presence of any obstruction.

In addition, the signal processing circuit 40 will not provide any external electromagnetic induction noise signal as the reception signal to the controller C. Therefore, the controller C will not erroneously determine the presence of any obstruction.

Figure 8:
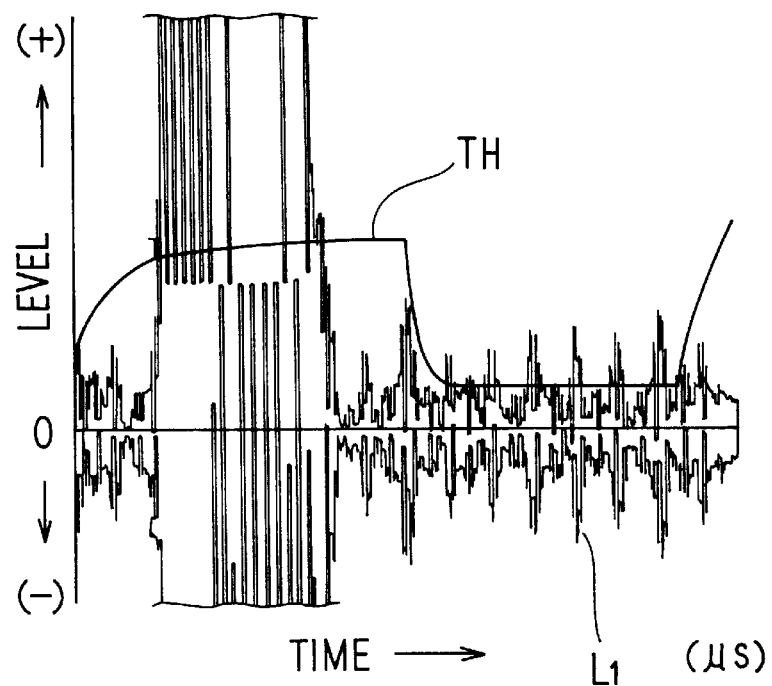
FIG. 8 is a graph showing changes in the level of a reception signal from a processor of an ultrasonic sensor that does not have a short ring with respect to changes in the electromagnetic induction field in the vicinity of the ultrasonic sensor.
Figure 9:
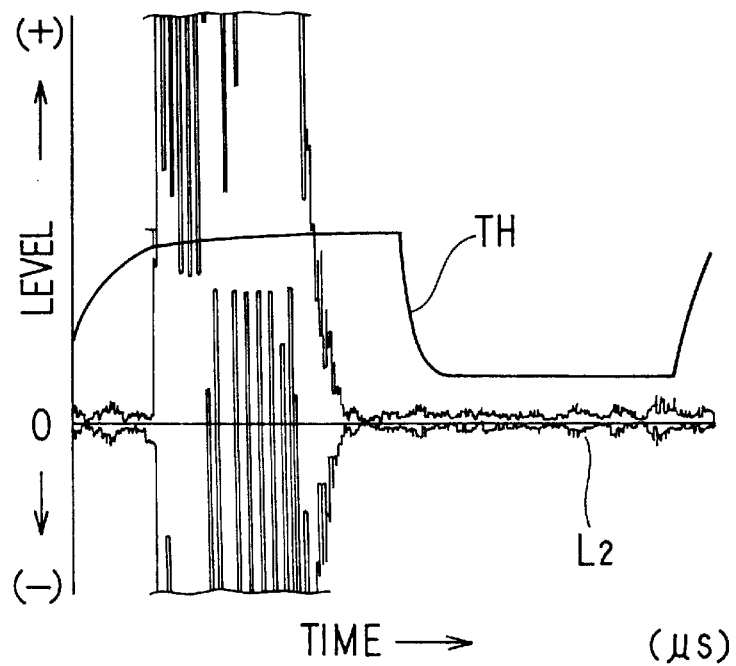
FIG. 9 is a graph showing changes in the level of a reception signal from a processor of the ultrasonic sensor according to the first embodiment with respect to changes in the electromagnetic induction field in the vicinity of the ultrasonic sensor.

Meanwhile, FIGS. 8 and 9 show experimental results of how the level of the reception signal from the signal processing circuit 40 changes when the short ring 80 is provided for the ultrasonic sensor S. FIG. 8 shows the results for the ultrasonic sensor S without the short ring 80 while FIG. 9 shows the results for the ultrasonic sensor S with the short ring 80. L1 indicates the level of the reception signal in FIG. 8 while L2 indicates the level of the reception signal in FIG. 9. TH indicates the threshold level of the controller C.

From FIGS. 8 and 9, it can be seen that the fluctuation band of the reception signal is narrower in FIG. 9 (that is, the case when the ultrasonic sensor S has the short ring 80) than in FIG. 8 (that is, the case when there the ultrasonic sensor does not have the short ring 80). Accordingly, the ultrasonic sensor C without the short ring 80 will erroneously detect the presence bf the obstruction while the ultrasonic sensor C with the short ring 80 will not erroneously detect the presence of any obstruction.

Figure 10:
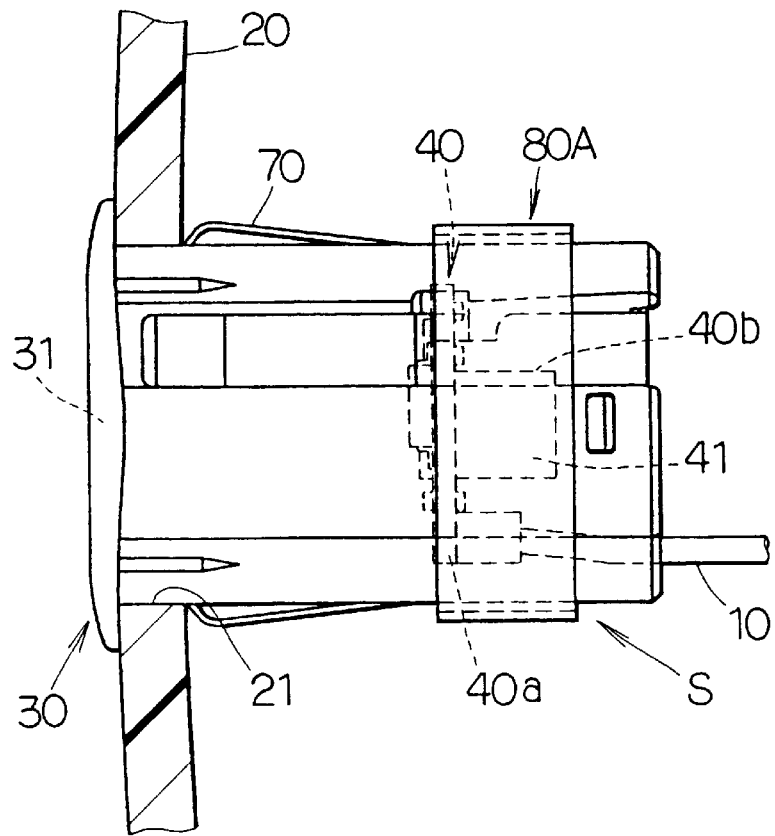
FIG. 10 is a side view of a variation of the ultrasonic sensor according to the first embodiment.

Main parts of a variation of the first embodiment are shown in FIG. 10. In this variation, instead of the short ring 80, a short ring 80A is fitted coaxially over the housing 30 to shield the transformer 40b. The width of the short ring 80A is greater than the axial length of the transformer 40b. All other parts are similar to those of the first embodiment.

With the above variation, even if fluctuation in the external electromagnetic induction field surrounding the ultrasonic sensor S acts on the coil 42g along its axial direction, the short ring 80A performs the same function as the short ring 80. In this way, this variation gives the same effects as the first embodiment.

Figure 11:
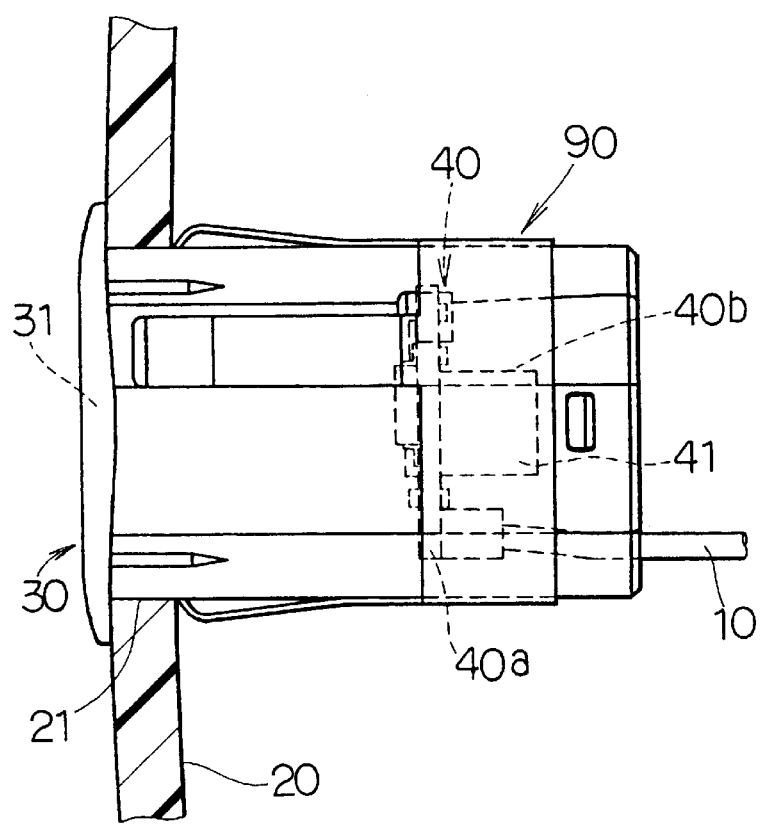
FIG. 11 is a side view of a further variation of the ultrasonic sensor according to the first embodiment.

While the retainer 70 and the short ring 80A are provided separately in the foregoing variation, as shown in FIG. 11, the retainer 70 and the short ring 80A may be made into one integral member 90 using conductive spring material such as bronze or the like. In this way, the ultrasonic sensor S will have fewer parts while giving the same advantageous effects as the first embodiment.

Figure 12:
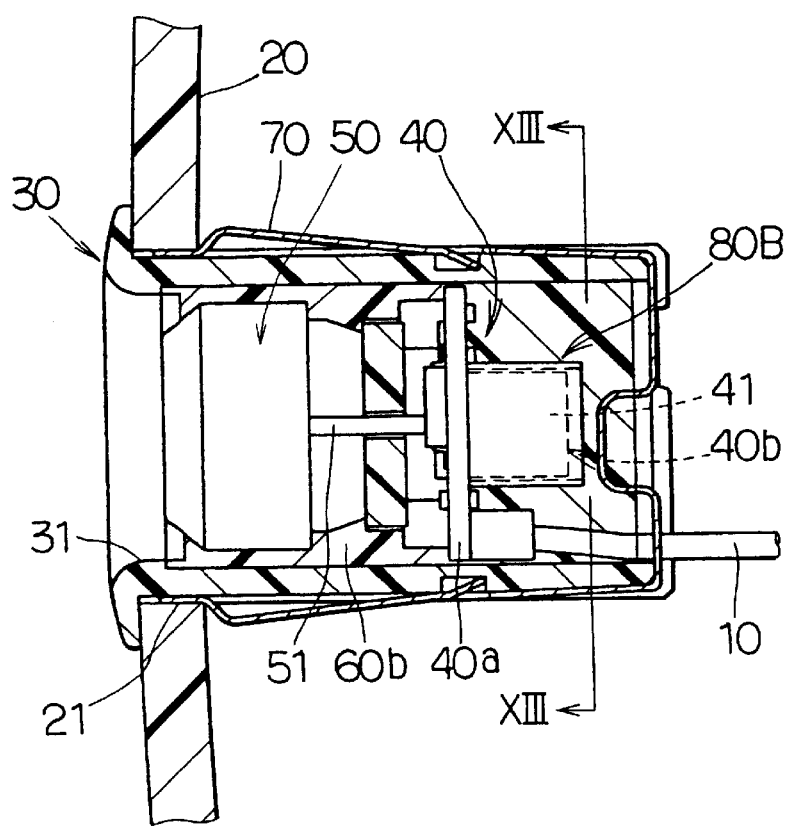
FIG. 12 is a cross-sectional diagram of the ultrasonic sensor according to a second preferred embodiment of the present invention.
Figure 13:
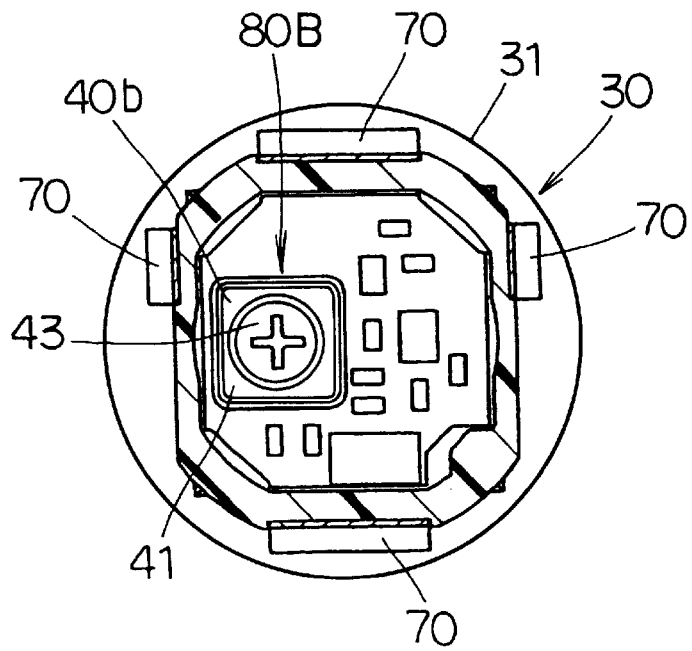
FIG. 13 is a cross-sectional diagram of the ultrasonic sensor as seen from XIII—XIII of FIG. 12.

A second preferred embodiment of the present invention is explained hereinafter with reference to FIGS. 12 and 13. In place of the short ring 80, the ultrasonic sensor S of the present embodiment has a short ring (conductive ring) 80B which is fitted over the casing 41 to shield the coil 42g. The width of the short ring 80B is approximately equal to the sum of the axial length of the casing 41 and the axial length of the pedestal 40a. The other components of the ultrasonic sensor S of the present embodiment are similar to those in the first embodiment.

In the present embodiment, when an external electromagnetic induction field in the vicinity of the ultrasonic sensor S fluctuates and affects the coil 42g in its axial direction, the short ring 80B will shield the coil 42g from such fluctuation. Accordingly, the present embodiment gives the same advantageous effects as the first embodiment. It must be noted that the width of the short ring 80B may be the same as the axial length of the coil 42g.

Figure 14:
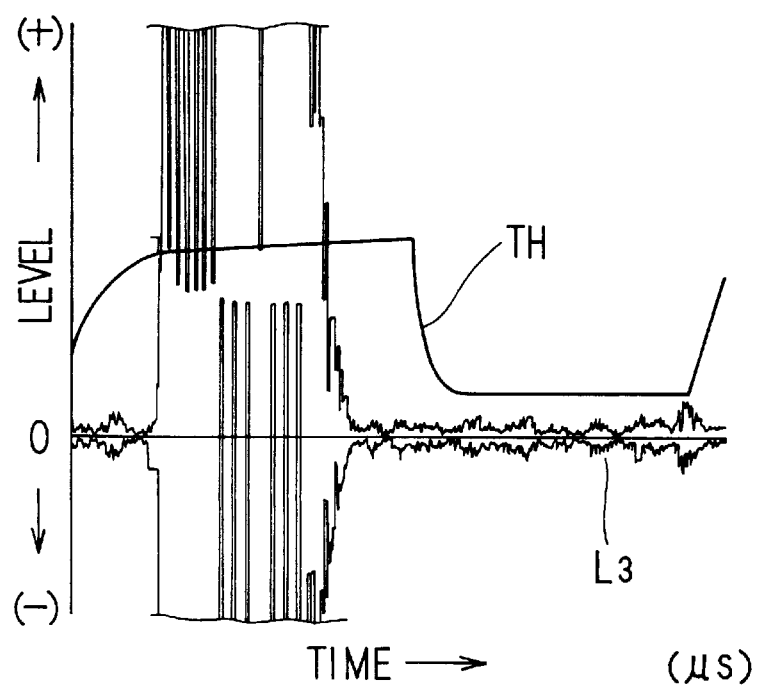
FIG. 14 is a graph showing changes in the level of a reception signal from a processor of the ultrasonic sensor according to the second embodiment with respect to changes in the electromagnetic induction field in the vicinity of the ultrasonic sensor.

Meanwhile, FIG. 14 shows experimental results of how fluctuations in the external electromagnetic induction field in the vicinity of the ultrasonic sensor S provided with the short ring 80B affects the level of the reception signal from the signal processing circuit 40. L3 indicates the level of the reception signal. It must be noted that the level of fluctuation of the reception signal in FIG. 14 is smaller than the level of fluctuation of the reception signal in FIG. 8. In this way, the provision of the short ring 80B prevents erroneous determination of an obstruction by the controller C.

Figure 15:
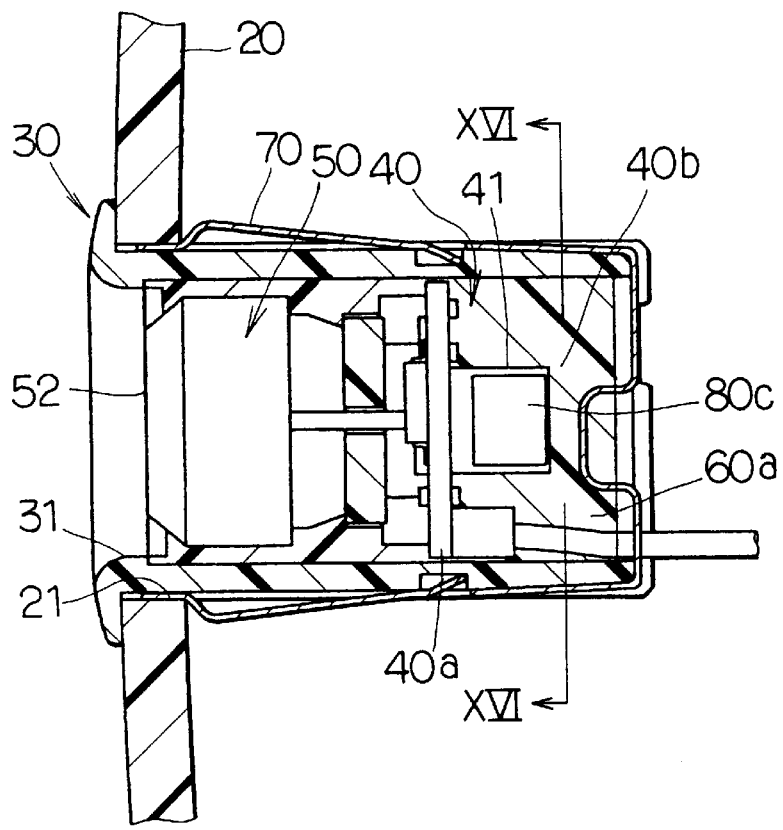
FIG. 15 is a variation of the ultrasonic sensor according to the second embodiment.
Figure 16:
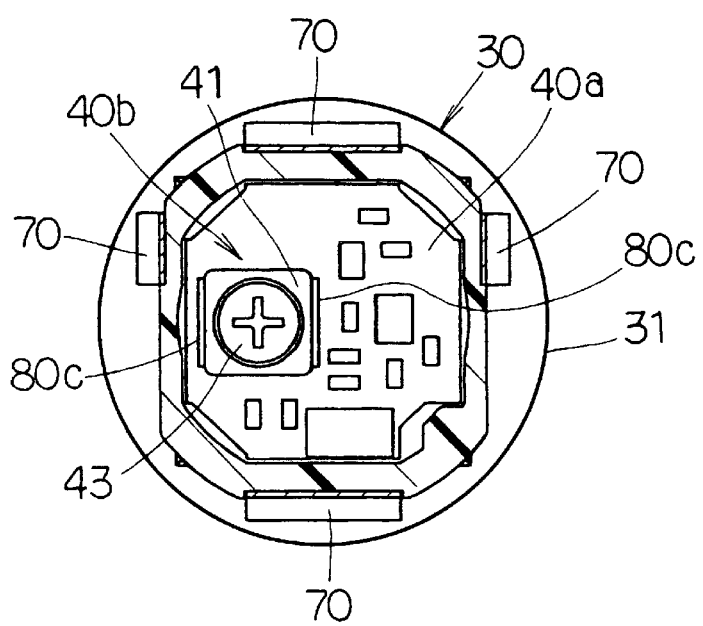
FIG. 16 is a cross-sectional diagram of the ultrasonic sensor as seen from XVI—XVI of FIG. 15.

FIGS. 15 and 16 show a variation of the ultrasonic sensor S according to the second embodiment. In this variation, instead of the short ring 80B, conducting plates 80C (which are made up of excellent metallic conducting material) are attached to the female screw parts 41*d* of the casing 41 of the transformer 40*b* to shield the same screw parts 41*d*. The other parts of this variation are the same as those of the second embodiment. The conducting plates 80C together with the casing 41 perform the same functions as the short ring 80B. As a result, this variation gives the same advantageous effects as the second embodiment.

Although the present invention has been fully described in connection with preferred embodiments thereof with reference to the accompanying drawings, it is to be noted that various changes and modifications will become apparent to those skilled in the art.

While the resonance circuit of the ultrasonic sensor S according to the foregoing embodiments includes the capacitor 53 and the coil 42*g* that is parallel to the capacitor 53, the same advantageous effects may still be obtained with the resonance circuit of the ultrasonic sensor S may also be one wherein the capacitor 53 is in series with coil 42*g* and a resistor element mounted on the circuit board 40*a*.

While the coil 42*g* of the transformer 40*b* is coaxial with the housing 30 in the aforementioned embodiments, the transformer 40*b* may also be oriented such that the axis of its coil 42*g* intersects with the axis of the housing 30. In this way, the coil 42*g* may be protected from fluctuations in the external electromagnetic induction field that is acting in the direction that intersects with the axis of the housing 30.

Also, while it is desirable to provide a short ring that has a high conductivity, it will be enough to provide a short ring that allows substantial flow of electric current.

While the foregoing embodiments give the above-described advantageous effects irrespective of whether the short ring or the conductive plate are connected to ground or not, if the short ring is grounded, it will be better that the short ring is grounded in one place.

In addition, the capacitor 53 of the ultrasonic resonator may be mounted on the circuit board 40*a* of the signal processing circuit 40. Also, a piezoelectric element may be used in place of the capacitor 53.

Moreover, the present invention may be applied not only to vehicular obstruction detectors but also to automatic doors and other various devices.

Such changes and modifications are to be understood as being within the scope of the present invention as defined by the appended claims.

What is claimed is:

1. An ultrasonic sensor comprising:

a housing;

a resonance circuit that is placed inside said housing and that includes a coil unit and an ultrasonic resonator, said ultrasonic resonator including a piezoelectric element, said ultrasonic resonator being for emitting a transmission ultrasonic wave signal towards the outside of said housing based on the piezoelectric effect of said piezoelectric element and for receiving a reception ultrasonic wave signal from the outside of said housing, said reception ultrasonic wave signal being a reflection of said transmission ultrasonic wave signal, wherein said coil unit includes a transformer and a conductive casing having an axially extended slit, said transformer being inserted into said conductive casing through said slit; and a conductive ring that is disposed around said casing to be coaxial with said coil unit and to shield said coil unit from an external electromagnetic induction field.

2. An ultrasonic sensor according to claim 1, said sensor further comprising a retainer for securely attaching said housing to a vehicular bumper which is adjacent to an engine and an auxiliary machine of a vehicle.

3. An ultrasonic sensor according to claim 2, wherein said retainer and said conductive ring are formed in a single body.

4. An ultrasonic sensor according to claim 1, wherein the conductive ring is made of copper.

5. An ultrasonic sensor comprising:

a housing;

a transformer disposed inside said housing, said transformer including a primary coil and a secondary coil;

a conductive casing enclosing said primary coil and said secondary coil of the transformer;

an ultrasonic resonator that is coupled to said secondary coil and that includes a piezoelectric element, said ultrasonic resonator being for emitting a transmission ultrasonic wave signal towards the outside of said housing based on the piezoelectric effect of said piezoelectric element and for receiving a reception ultrasonic wave signal from the outside of said housing, said reception ultrasonic wave signal being a reflection of said transmission ultrasonic wave signal; and a conductive ring that is disposed around said transformer and said conductive casing to be coaxial with said transformer and to shield said secondary coil from an external electromagnetic induction field.

6. An ultrasonic sensor according to claim 5, said sensor further comprising a retainer for securely attaching said housing to a vehicular bumper which is adjacent to an engine and an auxiliary machine of a vehicle.

7. An ultrasonic sensor according to claim 5, wherein the conductive casing has an axial length which is greater than an axial length of said transformer.

8. An ultrasonic sensor according to claim 5, wherein the conductive ring is made of copper.

9. An ultrasonic sensor comprising:

a transformer that includes:

a conductive casing;

a coil unit that is placed inside said casing to be coaxial with said casing; and a cover that is inserted to said casing to cover said coil unit;

an ultrasonic resonator that is coupled to said coil unit and that includes a piezoelectric element, said ultrasonic resonator being for emitting a transmission ultrasonic wave signal towards the outside of said casing based on the piezoelectric effect of said piezoelectric element and for receiving a reception ultrasonic wave signal from the outside of said casing, said reception ultrasonic wave signal being a reflection of said transmission ultrasonic wave signal; and a conductive plate that is disposed around said casing to be coaxial with said casing and to shield said coil unit from an external electromagnetic induction field.

10. An ultrasonic sensor according to claim 9, wherein said conductive casing has an opening extending in an axial direction of said coil unit thereby to allow said coil unit to be inserted.

11. An ultrasonic sensor according to claim 10, wherein said conductive plate covers said opening.

12. An ultrasonic sensor according to claim 10, wherein said conductive plate is disposed outside said conductive ring to cover said opening.

13. An ultrasonic sensor according to claim 12, wherein said coil unit is thread-engaged with said conductive casing through openings provided in said conductive casing.

14. An ultrasonic sensor according to claim 9, wherein said conductive plate is in contact with said conductive casing over an entire periphery of said casing.

15. An ultrasonic sensor according to claim 9, wherein the conductive plate is made of copper.

16. An ultrasonic sensor comprising:
   a housing;
   an ultrasonic resonator that is placed inside said housing, said ultrasonic resonator including a piezoelectric element;
   a coil unit collectively forming a resonance circuit with an electrostatic capacitor component of said ultrasonic resonator, said resonance circuit being for receiving a reception ultrasonic wave signal from the outside of said housing;
   a conductive casing surrounding the coil unit; and
   a conductive ring disposed at least around said coil unit and said casing to be parallel with said coil unit and to shield said coil unit from an external electromagnetic induction field.

17. An ultrasonic sensor according to claim 16, wherein said coil unit is placed inside said housing.

18. An ultrasonic sensor according to claim 17, said sensor further comprising a retainer for securely attaching said housing to a vehicular bumper which is adjacent to an engine and an auxiliary machine of a vehicle.

19. An ultrasonic sensor according to claim 18, wherein said retainer and said conductive ring are formed in a single body.

20. An ultrasonic sensor according to claim 16, wherein said resonance circuit is for emitting a transmission ultrasonic wave signal towards the outside of said housing based on the piezoelectric effect of said piezoelectric element and said reception ultrasonic wave signal is a reflection of said transmission ultrasonic wave signal.

21. An ultrasonic sensor according to claim 20, wherein said coil unit forms a driving pulse signal for said ultrasonic resonator by boosting a pulse signal.

22. An ultrasonic sensor according to claim 16, wherein the conductive ring is made of copper.

23. An obstruction detector for detecting an obstruction, said obstruction detector comprising:
   an ultrasonic sensor that includes:
      a housing;
      a resonance circuit that is placed inside said housing and that includes a coil unit and an ultrasonic resonator, said ultrasonic resonator including a piezoelectric element, said ultrasonic resonator being for emitting a transmission ultrasonic wave signal towards the outside of said housing based on the piezoelectric effect of said piezoelectric element and for receiving a reception ultrasonic wave signal from the outside of said housing, said reception ultrasonic wave signal being a reflection of said transmission ultrasonic wave signal, said resonance circuit further including a conductive casing enclosing said coil unit therein; and
      a conductive plate that is disposed around said casing to be coaxial with said coil unit and to shield said coil unit from an external electromagnetic induction field; and
   a controller for providing a driving voltage to said resonance circuit to activate said ultrasonic resonator, for receiving said reception ultrasonic wave signal from said ultrasonic resonator and for determining the presence of an obstruction in the forward direction of said ultrasonic sensor by comparing the level of said reception ultrasonic wave signal with a predetermined threshold level.

24. An obstruction detector according to claim 23, wherein said sensor further includes a circuit board to which said coil unit and said ultrasonic resonator are mounted.

25. An obstruction detector according to claim 24, said detector further including a retainer for securely attaching said housing to a vehicular bumper which is adjacent to an engine and an auxiliary machine of a vehicle.

26. An obstruction detector according to claim 25, wherein said retainer and said conductive ring are formed in a single body.

27. An ultrasonic sensor according to claim 23, wherein the conductive plate is made of copper.

28. An ultrasonic sensor comprising:
   a housing;
   a resonance circuit that is placed inside said housing and that includes a coil unit inside a conductive casing and an ultrasonic resonator, said ultrasonic resonator including a piezoelectric element, said ultrasonic resonator being for emitting a transmission ultrasonic wave signal towards the outside of said housing based on the piezoelectric effect of said piezoelectric element and for receiving a reception ultrasonic wave signal from the outside of said housing, said reception ultrasonic wave signal being a reflection of said transmission ultrasonic wave signal; and
   a conductive plate that is disposed around said casing to be coaxial with said coil unit and to shield said coil unit from an external electromagnetic induction field, the conducive plate generating a counter electromotive force by electromagnetic induction in response to changes in the external electromagnetic induction field.

29. An ultrasonic sensor according to claim 28, wherein the conductive plate has an axial length which is greater than an axial length of said transformer.

30. An ultrasonic sensor according to claim 28, wherein said coil unit is thread-engaged with said conductive casing through openings provided in said conductive casing.

31. An ultrasonic sensor comprising:
   a housing;
   a transformer disposed inside said housing, said transformer including a conductive casing, a primary coil and a secondary coil, said primary coil and said secondary coil being placed inside said casing;
   an ultrasonic resonator that is coupled to said secondary coil and that includes a piezoelectric element, said ultrasonic resonator being for emitting a transmission ultrasonic wave signal towards the outside of said housing based on the piezoelectric effect of said piezoelectric element and for receiving a reception ultrasonic wave signal from the outside of said housing, said reception ultrasonic wave signal being a reflection of said transmission ultrasonic wave signal; and a conductive plate that is disposed around said casing to be coaxial with said transformer and to shield said secondary coil from an external electromagnetic induction field, the conducive plate generating a counter electromotive force by electromagnetic induction in response to changes in the external electromagnetic induction field.

32. An ultrasonic sensor according to claim 31, wherein said casing has an opening extending in an axial direction of said coil unit thereby to allow said coil unit to be inserted.

33. An ultrasonic sensor according to claim 32, wherein said conductive plate covers said opening.

34. An ultrasonic sensor according to claim 32, wherein said conductive plate is disposed outside said conductive casting to cover said opening.

35. An ultrasonic sensor according to claim 31, wherein said conductive plate is in contact with said casing over an entire periphery of said casing.

36. An ultrasonic sensor comprising:

a housing;

an ultrasonic resonator that is placed inside said housing, said ultrasonic resonator including a piezoelectric element;

a coil unit placed inside a conductive casing, collectively forming a resonance circuit with an electrostatic capacitor component of said ultrasonic resonator, said resonance circuit being for receiving a reception ultrasonic wave signal from the outside of aid housing; and a conductive plate disposed at least around said casing to be parallel with said coil unit and to shield said coil unit from an external electromagnetic induction field.

37. An ultrasonic sensor according to claim 36, wherein said resonance circuit is for emitting a transmission ultrasonic wave signal towards the outside of said housing based on the piezoelectric effect of said piezoelectric element and said reception ultrasonic wave signal is a reflection of said transmission ultrasonic wave signal.

38. An ultrasonic sensor according to claim 37, wherein said coil unit forms a driving pulse signal for said ultrasonic resonator by boosting a pulse signal.

39. An ultrasonic sensor according to claim 36, said sensor further comprising a retainer for securely attaching said housing to a vehicular bumper which is adjacent to an engine and an auxiliary machine of a vehicle.

40. An obstruction detector for detecting an obstruction, said obstruction detector comprising:

an ultrasonic sensor that includes:

a housing;

a resonance circuit that is placed inside said housing and that includes a coil unit inside a conductive casing and an ultrasonic resonator, said ultrasonic resonator including a piezoelectric element, said ultrasonic resonator being for emitting a transmission ultrasonic wave signal towards the outside of said housing based on the piezoelectric effect of said piezoelectric element and for receiving a reception ultrasonic wave signal from the outside of said housing, said reception ultrasonic wave signal being a reflection of said transmission ultrasonic wave signal; and a conductive plate that is disposed around said casing to be coaxial with said coil unit and to shield said coil unit from an external electromagnetic induction field; and a controller for providing a driving voltage to said resonance circuit to activate said ultrasonic resonator, for receiving said reception ultrasonic wave signal from said ultrasonic resonator and for determining the presence of an obstruction in the forward direction of said ultrasonic sensor by comparing the level of said reception ultrasonic wave signal with a predetermined threshold level.

41. An obstruction detector according to claim 40, wherein said sensor further includes a circuit board to which said coil unit and said ultrasonic resonator are mounted.

42. An obstruction detector according to claim 41, said detector further including a retainer for securely attaching said housing to a vehicular bumper which is adjacent to an engine and an auxiliary machine of a vehicle.

\* \* \* \* \*